(12) United States Patent
Kim

(10) Patent No.: US 9,625,977 B2
(45) Date of Patent: Apr. 18, 2017

(54) APPARATUS AND METHOD FOR SCREEN POWER SAVING IN ELECTRONIC DEVICE

(71) Applicant: Samsung Electronics Co., Ltd., Gyeonggi-do (KR)

(72) Inventor: Minwoo Kim, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 124 days.

(21) Appl. No.: 14/569,371

(22) Filed: Dec. 12, 2014

(65) Prior Publication Data

US 2015/0169038 A1 Jun. 18, 2015

(30) Foreign Application Priority Data

Dec. 13, 2013 (KR) .................. 10-2013-0155897

(51) Int. Cl.
*G06F 3/038* (2013.01)
*G06F 1/32* (2006.01)
*G09G 3/20* (2006.01)
*G09G 5/00* (2006.01)
(Continued)

(52) U.S. Cl.
CPC .......... *G06F 1/3265* (2013.01); *G06F 1/3237* (2013.01); *G06F 1/3287* (2013.01); *G06F 3/0416* (2013.01); *G09G 3/20* (2013.01); *G09G 3/36* (2013.01); *G09G 5/003* (2013.01); *G09G 2310/061* (2013.01); *G09G 2330/021* (2013.01); *G09G 2330/022* (2013.01);
(Continued)

(58) Field of Classification Search
CPC ...... G09G 2330/021; G09G 3/20; G09G 3/36; G09G 5/003; G06F 1/3265; G06F 1/3237; G06F 1/3287; G06F 3/0416; Y02B 60/1282; Y02B 60/1221; Y02B 60/1242
USPC ......................................... 345/213
See application file for complete search history.

(56) References Cited

U.S. PATENT DOCUMENTS

2002/0093473 A1* 7/2002 Tanaka ................ G09G 3/3648
345/87
2003/0014675 A1* 1/2003 Lee ........................ G09G 5/003
713/310
(Continued)

FOREIGN PATENT DOCUMENTS

KR 10-2013-0117163 10/2013
WO WO 2013090584 A1 6/2013

OTHER PUBLICATIONS

Extended European Search Report dated Mar. 20, 2015 in connection with European Patent Application No. 14197455.0; 10 pages.

*Primary Examiner* — Adam J Snyder

(57) ABSTRACT

A screen display control method includes a screen change operation, which includes, in response to a screen change request, outputting data of a screen to be changed, to a display unit and predicting a next screen change cycle, and an operation of switching into a power saving mode when there is no screen change request. An electronic device includes an event generation unit configured to generate a screen change event, a display unit configured to receive screen change data and change a displayed screen, and a controller configured to in response to a detected screen change event, output data of a screen to be changed, to the display unit, predict a next screen change cycle, and switch into a power saving mode when there is no screen change request.

21 Claims, 11 Drawing Sheets

(51) Int. Cl.
  *G06F 3/041* (2006.01)
  *G09G 3/36* (2006.01)
(52) U.S. Cl.
  CPC ...... *G09G 2360/08* (2013.01); *Y02B 60/1221* (2013.01); *Y02B 60/1242* (2013.01); *Y02B 60/1282* (2013.01)

(56) References Cited

U.S. PATENT DOCUMENTS

| | | | | |
|---|---|---|---|---|
| 2003/0156106 A1* | 8/2003 | Byun | ................. | G09G 5/003 345/212 |
| 2003/0193459 A1* | 10/2003 | Kim | ................. | G09G 3/006 345/87 |
| 2004/0061696 A1* | 4/2004 | Kim | ................. | G09G 3/14 345/211 |
| 2005/0124389 A1* | 6/2005 | Yang | ................. | H04B 1/1615 455/574 |
| 2007/0262946 A1* | 11/2007 | Chen | ................. | G09G 3/3648 345/102 |
| 2008/0028240 A1* | 1/2008 | Arai | ................. | G06F 1/3203 713/300 |
| 2009/0278830 A1* | 11/2009 | Onishi | ................. | G09G 5/003 345/211 |
| 2010/0245316 A1* | 9/2010 | Cheng | ................. | G09G 3/3648 345/211 |
| 2012/0133635 A1* | 5/2012 | Ji | ................. | G09G 3/3688 345/212 |
| 2012/0169698 A1* | 7/2012 | Park | ................. | G09G 3/3648 345/211 |
| 2013/0262896 A1* | 10/2013 | Yoneda | ................. | G06F 1/3237 713/322 |
| 2014/0218350 A1 | 8/2014 | Wee et al. | | |

* cited by examiner

APPARATUS AND METHOD FOR SCREEN POWER SAVING IN ELECTRONIC DEVICE

CROSS-REFERENCE TO RELATED APPLICATION AND CLAIM OF PRIORITY

The present application is related to and claims priority from and the benefit under 35 U.S.C. §119(a) of Korean Patent Application No. 10-2013-0155897, filed on Dec. 13, 2013, which is hereby incorporated by reference for all purposes as if fully set forth herein.

TECHNICAL FIELD

The present invention relates to an apparatus and a method for controlling transmission of display data to a display unit in an electronic device.

BACKGROUND

In general, an electronic device supplies an operation power using a battery. Therefore, the electronic device uses various methods for reducing power consumption. The display unit of the electronic device may include a Liquid Crystal Display (LCD) or a Light Emitting Diode (LED) device and shows a trend toward an increase in volume. As a result, there is a trend toward an increase in power consumption by a display unit of an electronic device. In order to solve this problem, the display unit is turned off to reduce the power consumption in an idle state where the display unit does not operate.

Further, the electronic device may transmit display data to the display unit at a configured frame rate in order to display information of an executed application. When the electronic device transmits the display data to the display unit, the electronic device uses the Display Clock/Power Gating technology in order to reduce the current consumption. The Display Clock/Power Gating technology is a technology for reducing the current consumption by blocking, step by step, clocks and/or power to display blocks inside or outside a Central Processing Unit (CPU) of a portable terminal in a section having no screen update (User Interface (UI) change).

SUMMARY

An electronic device is required to be capable of processing display data having different frame rates according to executed applications. Therefore, in the case of using the Display Clock/Power Gating technology to reduce the current consumption, when the power is turned on from the power-off state in order to transmit display data to the display unit, the configuration time for transmission of data may be prolonged, thereby increasing the power consumption and delaying the display.

Therefore, it is desirable to solve the problems of an increase in the current consumption and delay of the display by dynamically configuring, according to executed applications, the time for determining the clock/power gating when the electronic device transmits display data to the display unit.

To address the above-discussed deficiencies, it is a primary object to provide a screen display control method according to various embodiments of the present disclosure may include: a screen change operation, which includes, in response to a screen change request, outputting data of a screen to be changed, to a display unit and predicting a next screen change cycle; and an operation of switching into a power saving mode when there is no screen change request.

A screen display control method of an electronic device according to various embodiments of the present disclosure may include: an operation of supplying a clock and power to a display block at a preconfigured time point before screen change; an operation of, in response to a screen change request, outputting data of a screen to be changed, to a display unit and predicting a next screen change cycle; and an operation of switching into a power saving mode when there is no screen change request.

An electronic device according to various embodiments of the present disclosure may include: an event generation unit that generates a screen change event; a display unit that receives screen change data and changes a displayed screen; and a controller that, in response to a detected screen change event, outputs data of a screen to be changed, to the display unit, predicts a next screen change cycle, and switches into a power saving mode when there is no screen change request.

In reducing power consumption of a battery using the clock/power gating technology, an electronic device according to various embodiments of the present disclosure can analyze screen change cycles according to executed applications and dynamically configure clock gating and/or power gating time, thereby minimizing the current consumption. Further, in the case where screen change occurs in the electronic device, the restarting of the display block is performed ahead of time using an event recognizable ahead of time. Therefore, it is possible to reduce the display delay time.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Further.

DETAILED DESCRIPTION

Figure 1:
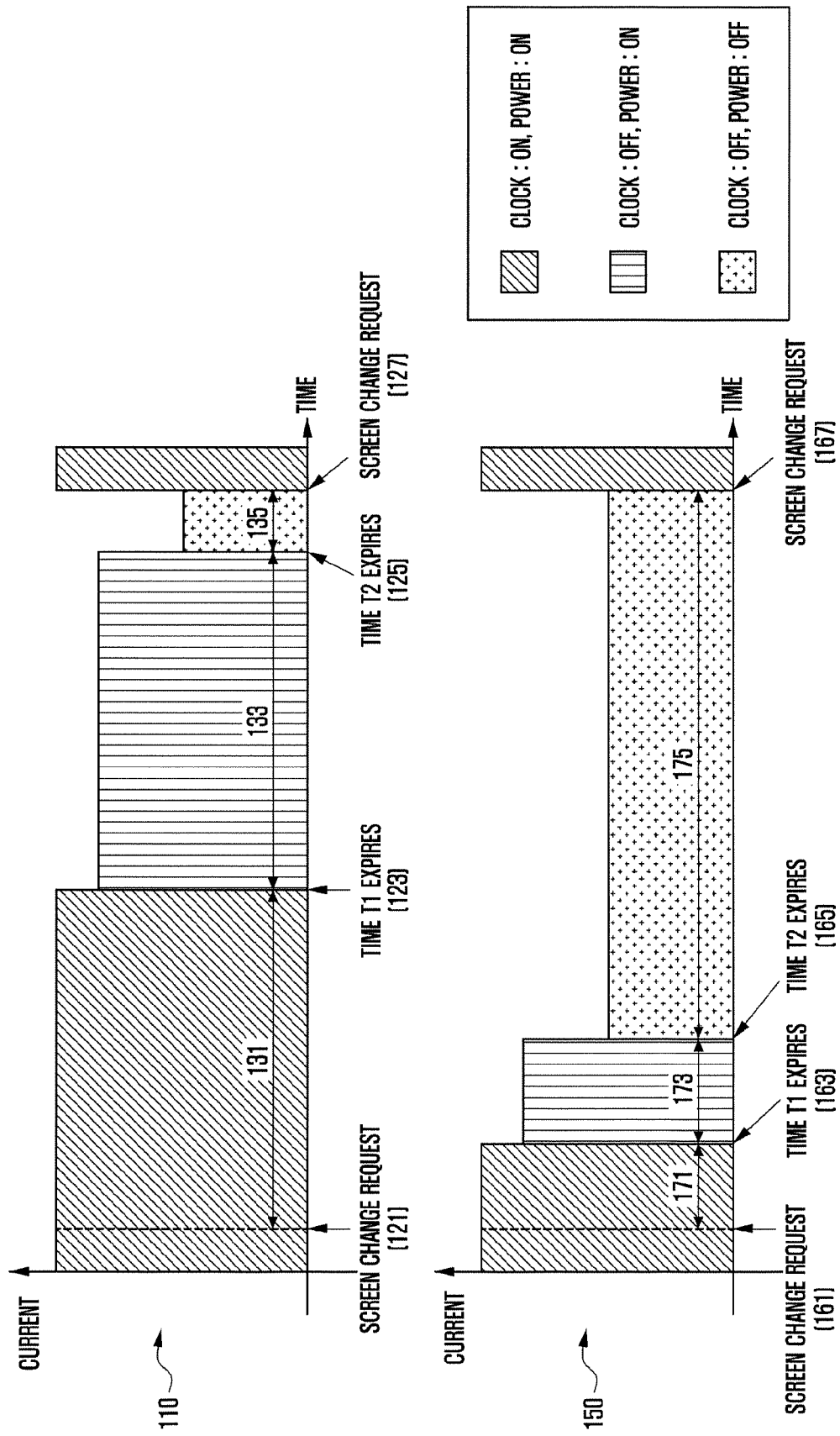
FIG. 1 is a view for describing display clock/power gating in an electronic device.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, embodiments of the present disclosure will be described with reference to the accompanying drawings. The present disclosure may have various modifications and embodiments and thus will be described in detail with reference to specific embodiments illustrated in the drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, identical or similar reference numerals are used to designate identical or similar elements.

In the present disclosure, the expression "include" or "may include" refers to existence of a corresponding function, operation, or element, and does not limit one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

An electronic device according to the present disclosure can be a device including a communication function. For example, the electronic device can include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD) such as electronic glasses, electronic clothes, an electronic bracelet, an electronic necklace, an electronic appcessory, electronic tattoos, or a smartwatch).

According to an embodiment, an electronic device can be a smart home appliance with a communication function. The smart home appliances can include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device can include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to another embodiment, the electronic devices can include at least one of furniture or a part of a building/structure having a communication function, electronic boards, electronic signature receiving devices, projectors, or various measuring equipment (e.g., equipment for a water supply, an electricity, gases or radio waves). The electronic device according to the present disclosure can be a combination of one or more of the aforementioned various devices. Also, the electronic device according to the present disclosure can be a flexible device. Further, it is obvious to those skilled in the art that the electronic device according to the present disclosure is not limited to the aforementioned devices.

Hereinafter, an electronic device according to various embodiments of the present disclosure will be described with reference to the accompanying drawings. In various embodiments, the term "user" can indicate a person using an electronic device or a device (e.g. an artificial intelligence electronic device) using an electronic device.

First, the electronic device controls the transmission of display data by dynamically calculating various parameters necessary for the display clock/power gating when transmitting display data to a display unit. In this event, the electronic device can predict a screen request cycle of a next frame by analyzing cycles of previous frames when screen change is requested. Further, the electronic device can predict the next state to be changed, by measuring time consumed at the time of actual clock and/or power application for the clock/power gating.

Second, the electronic device can identify an additional event in order to accelerate the re-starting at the time of display clock/power gating. That is, the electronic device can perform task necessary for screen change by analyzing the screen change request according to a user input (key and touch), a user cycle of a 2D or 3D accelerator, a user cycle of a codec, and change of Dynamic Voltage Frequency Scaling (DVFS) ahead of time.

In the following description, the display block is an internal configurative module of a controller for transmitting display data to the display unit and can include all of an element for generating and detecting a display event, an element for controlling gating of a clock and/or power, and an element for transmitting display data to an external display unit. Further, in an embodiment of the present invention, a display module can be used as the same term as the display block.

Further, a clock timer is a timer for gating-controlling the clock and can be set to time T1. The clock timer can be used as the same term as a T1 timer. A power timer is a timer for gating-controlling the power and can be set to time T2. The power timer can be used as the same term as a T2 timer.

Further, the term "gating" refers to an operation of turning off the clock and/or power supply. Further, the gating control signal can be generated at a screen change request time point or a configured time point before screen change. When a screen change event occurs, the event is registered in an event detection unit, and a gating controller determines whether there exists an event registered before the configured time from the screen change time point, and generates, in advance, a gating control signal when the event exists. The gating time point can have different time values according to the states (clock/power on state, clock off/power on state, and clock/power off state) of the display block, and the gating control signal can be generated at different temporal positions according to the states.

Figure 2:
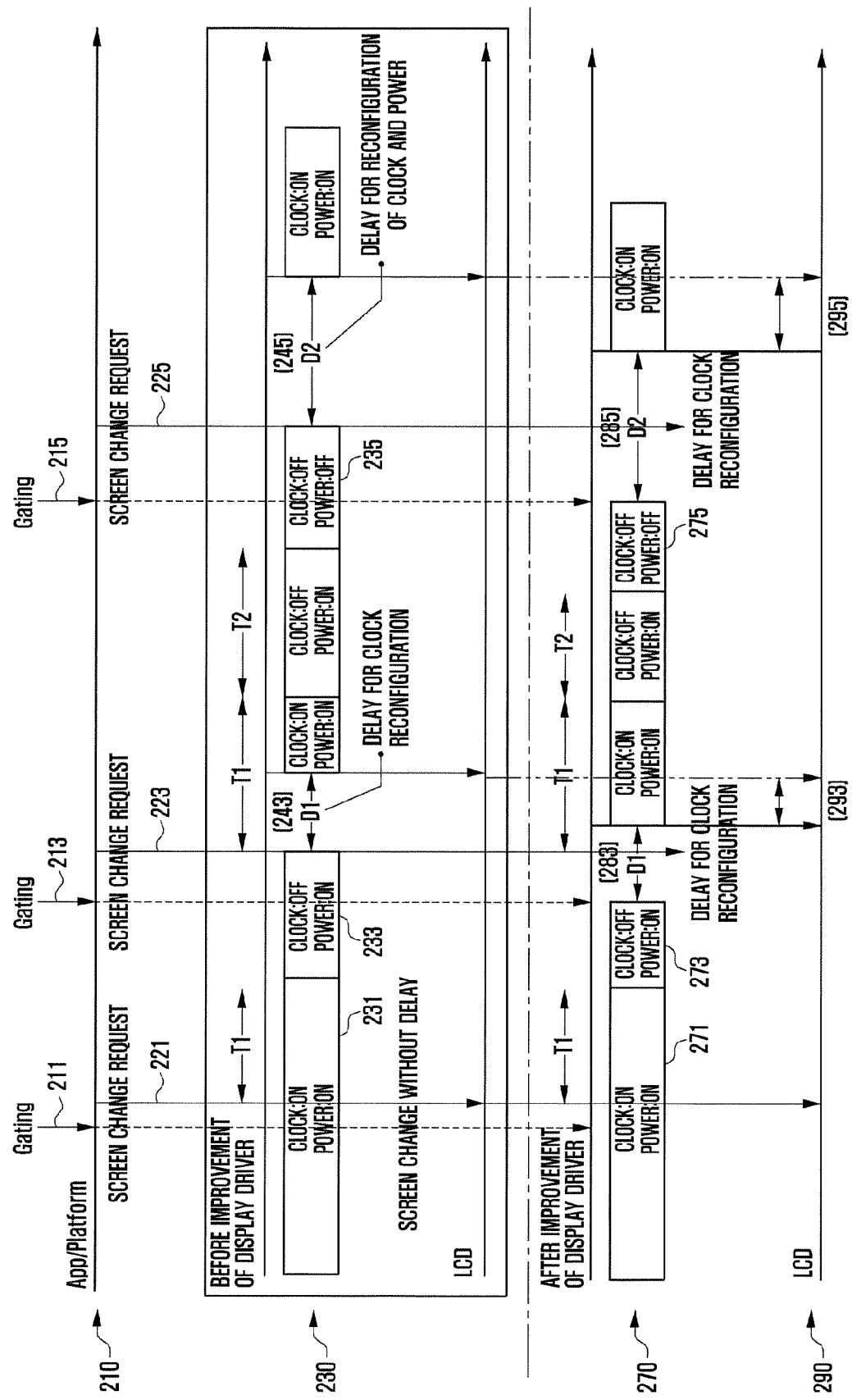
FIG. 2 is a view for describing an operation of reconfiguring a clock and power in a state where an electronic device performs display clock/power gating.

FIG. 1 is a view for describing display clock/power gating, and FIG. 2 is a view for describing an operation of reconfiguring a clock and power in a state where the display clock/power gating as shown in FIG. 1 is performed.

Referring to FIGS. 1 and 2, an electronic device using the display clock/power gating technology transmits display data to an external display unit while controlling the supply of clock and power to the display module (which will be mixedly used hereinafter with display block). That is, the display module can be disposed inside the controller, and can transmit the display data to an external display unit at the time of screen change. The display block can have a state where both a clock and power are supplied, a state where only the power is supplied, and a state where neither of the clock and the power are supplied. In the following description, T1 is defined as time having no screen change for determining whether it is in the clock gating and T2 is defined as time having no screen change for determining whether it is in the clock gating in a state where the clock has been blocked. Therefore, when there is no screen change request during time T1 in a state where both the clock and the power are applied to the display block, the clock of the display block is blocked. Further, when there is no screen change request during time T2 after the clock is blocked, the power of the display can be blocked.

First, in a state where the display block is normal as indicated by reference numeral 131 of FIG. 1 (clock: ON and power: ON), the electronic device transmits a changed image to an external display unit (e.g. LCD) when there is a screen change request as indicated by reference numeral 121, and then blocks the clock of the display block when there is no screen change until a predetermined time T1 passes as indicated by reference numeral 123 of FIG. 1. Second, in a state where the clock of the display block has been blocked as indicated by reference numeral 133 of FIG. 1 (clock: OFF and power: ON), the electronic device supplies a clock and then transmits a changed image to the LCD when there is a screen change request, and blocks the power of the display block when there is no screen change until a predetermined time T2 passes as indicated by reference numeral 125 of FIG. 1. Third, in a state where the power of the display block has been blocked as indicated by reference numeral 135 of FIG. 1 (clock: OFF and power: OFF), the electronic device supplies a clock and power and then transmits a changed image to the LCD when there is a screen change request as indicated by reference numeral 127 of FIG. 1. Further, when there is no screen change request, the electronic device can go into standby in the state where the clock and power have been blocked.

For example, if each of T1 and T2 is 50 msec, the electronic device blocks the clock of the display block when there is no screen change during T1 (50 msec). Thereafter, when there is no screen change during T2 (50 msec), the electronic device blocks the power of the display block. If there is a screen change request during the standby, the electronic device supplies power and transmits a changed image to the LCD.

Therefore, when the display clock/power gating is performed, the electric current consumption decreases due to the blocking of clock/power as indicated by reference numeral 110 of FIG. 1. However, an additional work of re-applying clock/power in order to change the screen is necessary in the clock/power has been blocked. This is because all values configured in the display block are initialized when the clock and/or power is blocked and should be reconfigured to be usable when they need to be used again. At this time, time is necessary for the reconfiguration. In this case, as noted from Table 1 below, the current consumption saving effect is small, the delay according to the restarting is short, and the amount of work to be done by the CPU is small at the time when the clock is blocked. In contrast, although the current consumption saving effect is big, the delay according to the restarting is long and the work to be done by the CPU is great at the time when the power is blocked.

TABLE 1

|  | Current consumption | Reconfiguration time | CPU load |
|---|---|---|---|
| clock gating | Small | Short (several msec) | Small |
| power gating | Big | Long (scores msec) | Large |

As noted from Table 1, a trade-off relation is established between the current consumption and the time for restarting, and this relation is determined by T1 and T2, the time for entering the clock/power gating. For example, it is assumed that, as indicated by reference numeral 110 of FIG. 1, each of T1 and T2 is set as 50 msec for entry into the clock/power gating and screen update is requested every 105 msec. In this case, the time in which the power gating has the maximum current consumption saving effect is about 5 msec, and additional switching operation and delay according to restarting are necessary every 105 msec. Therefore, more current for the CPU is consumed due to the switching operation according to the restarting. As a result, the current consumption by the CPU increases to decrease the current consumption according to the power gating. However, the current consumption may not be actually saved due to the increase in the use rate of the CPU. In the electronic device, the screen change request can be generated at various frame rates according to executed applications. Therefore, various screen change requests are generated when an application is executed in an electronic device. In this event, if times T1 and T2 are fixed, it can be impossible to reduce the current consumption in some situations.

Further, if the times T1 and T2 are fixed, display of the changed screen can be delayed due to the reconfiguration time. That is, by performing the display clock/power gating, the current consumption by the display block can be reduced, but reconfiguration time is necessary. Reference numeral 230 of FIG. 2 indicates examples of delay time D1 and D2 according to reconfiguration when a screen change is requested in the cases of the normal operation state (clock: ON and power: ON), the clock-blocked state (clock: OFF and power: ON), and the power-blocked state (clock: OFF and power: OFF). In detail, when there is a screen change request as indicated by reference numeral 221 in the normal operation state as indicated by reference numeral 231 of FIG. 2, the display block can transmit changed display data (e.g. image) to an external display unit (e.g. LCD) without delay. However, when there is a screen change request as indicated by reference numeral 223 in the state where the clock has been blocked as indicated by reference numeral 233 after passage of time T1, the display block can transmit changed display data (e.g. image) to an external display unit (e.g. LCD) after passage of D1 due to the occurrence of delay time for clock reconfiguration. However, when there is a screen change request as indicated by reference numeral 225 in the state where the clock and the power have been blocked as indicated by reference numeral 235 after passage of times T1 and T2, the display block can transmit changed display data (e.g. image) to an external display unit (e.g. LCD) after passage of D2 due to the occurrence of time delay for reconfiguration of clock and power.

Therefore, in order to minimize the current consumption of the display block, it is desirable to analyze and dynamically configure a screen change request cycle during a previously configured frame section as indicated by reference numeral 150 of FIG. 1, without stably configuring times T1 and T2 for determining the clock/power gating. In the case of the screen change request, it is possible to predict a future state by analyzing the previous state. Further, through such prediction, it is possible to dynamically adjust T1 and T2 as indicated by reference numerals 171 and 173 of FIG. 1, thereby maximizing the current consumption saving effect. When there is a screen change request as indicated by reference numeral 161 of FIG. 1, a clock and power are supplied to the display block to transmit display data to the display unit, and time T1 as indicated by reference numeral 171 and time T2 as indicated by reference numeral 173 can be dynamically configured. In this event, times T1 and T2 can be configured by an average value of screen change cycles requested during previously configured frames. Here, in a frame section having a long screen change cycle as indicated by reference numerals 161 and 167, the time for turning off the power and the clock as indicated by reference numeral 175 is prolonged and the power consumption can be thus greatly reduced.

Further, in order to minimize the time required for reconfiguration of the clock/power of the display block, it is possible to reduce the delay in the reconfiguration time by recognizing more quickly the screen change situation before a screen change request and preparing the screen change ahead of time. In general, the display block includes a 2D/3D GPU, an internal codec, and a user input (e.g. touch or key input) processing unit, by which screen change is requested. Further, times T1 and T2 are dynamically configured based on the screen change request cycle of previous frames. As a result, it is possible to predict the time point for a screen change request. Therefore, as indicated by reference numerals 210 of FIG. 2, it is possible to generate a gate control signal for reconfiguring the display block as indicated by reference numerals 211, 213, and 215 according to the state of the display block before an actual screen change request is generated as indicated by reference numerals 211, 213, and 215. In this event, when a screen change request is anticipated in a state where the clock and the power are turned on as indicated by reference numeral 271, the electronic device can generate the gating control signal at a time point adjacent to the screen change request time point as indicated by reference numerals 211 and 221. Further, when a screen change request is anticipated in a state where the clock is turned off (i.e. only the power is turned on) as indicated by reference numeral 273, the electronic device predicts the time in which the display block can reconfigure the clock and generates the gating control signal as indicated by reference numeral 213 before the screen change request time point as indicated by reference numeral 223. Further, when a screen change request is anticipated in a state where the clock and the power are turned off as indicated by reference numeral 275, the electronic device predicts the time in which the display block can reconfigure the clock and the power and generates the gating control signal as indicated by reference numeral 215 before the screen change request time point as indicated by reference numeral 225. In this event, the reconfiguration time is longest in the power off state and is shortest in the state where the clock and the power are supplied. Therefore, as indicated by reference numeral 210, different time points for gating according to the states of the display block as indicated by 211 and 221, 213 and 223, and 215 and 225 can be used to reconfigure the clock and/or power of the display block. In other words, the gating control signals can be generated ahead of time before the screen change requests as indicated by reference numerals 213 and 215 in consideration of the delay time D1 for clock reconfiguration as indicated by reference numeral 283 and the delay time D2 for reconfiguration of the clock and the power as indicated by reference numeral 285. As a result, as indicated by reference numeral 290, it is possible to reduce the delay of the display data actually transmitted to an external display unit as indicated by reference numerals 293 and 295.

Figure 3:
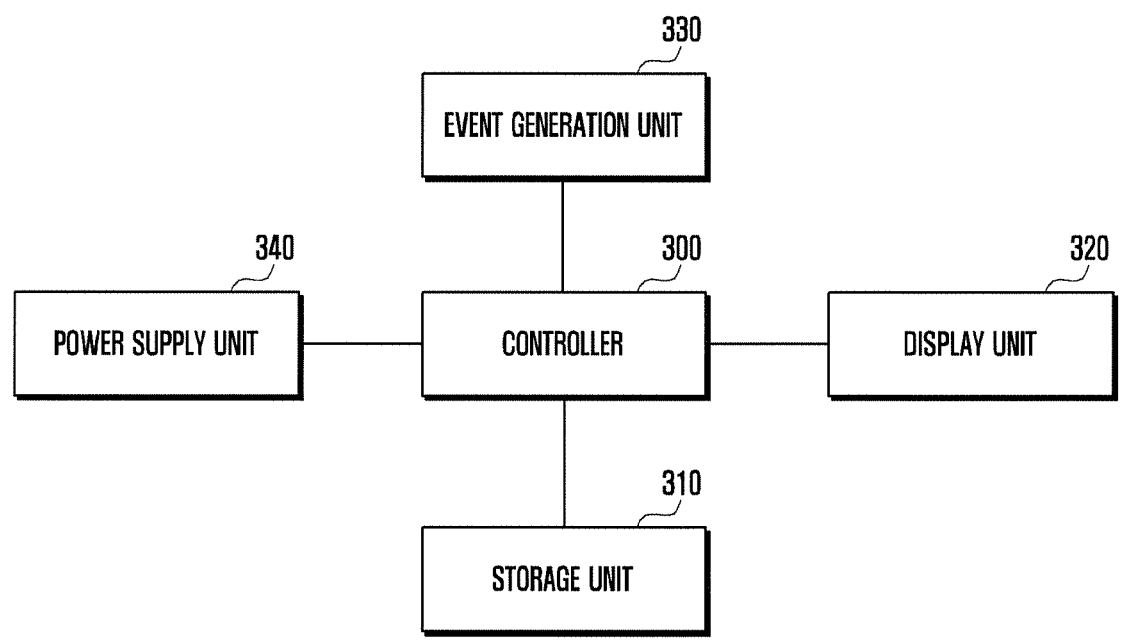
FIG. 3 is a block diagram illustrating a construction of an electronic device according to an embodiment of the present invention.
Figure 4:
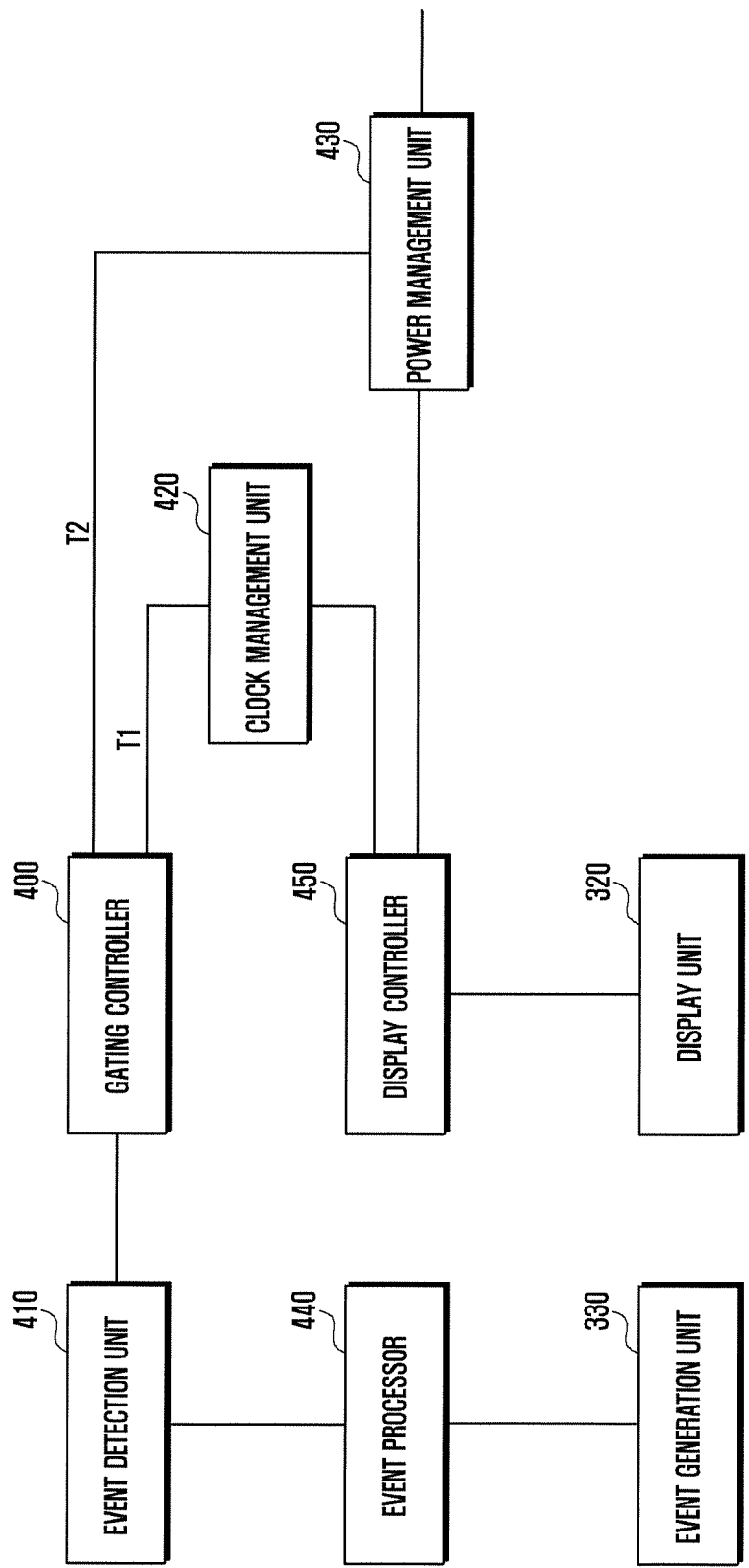
FIG. 4 is a block diagram illustrating a construction of a display block of the electronic device.

FIG. 3 is a block diagram illustrating a construction of an electronic device according to an embodiment of the present disclosure. Further, FIG. 4 is a block diagram illustrating a construction of a display module of the electronic device. The display module as shown in FIG. 4 can be an internal element in a controller.

Referring to FIGS. 3 and 4, the controller 300 can control general operations of the electronic device. A storage unit 310 can include a program memory storing programs for controlling the operation of the electronic device and a data memory storing data generated during execution of the programs. The power supply unit 340 can supply an operation power to the electronic device. An event generation unit 330 can generate various data for screen display. A display unit 320 can display data received under the control of the controller 300.

The controller 300 includes a display block, and the display block can generate display data at a frame rate configured according to an executed application and transmit the generated display data to the display unit 320. FIG. 4 is a block diagram illustrating the internal configuration of the controller 300. The event generation unit 330 can generate various events for changing the display data supplied to the display unit 320. As used herein, the events can include a key input, a sensor input, and change of display data in an executed application. When an event is generated by the event generation unit 330, an event processor 440 processes the generated event and an event detection unit 410 detects the processed event. Then, a gating controller 400 determines whether an event registered in the event detection unit 410 has been generated, and controls a clock management unit 420 and a power management unit 430 to apply a clock and power to a display controller 450 when an event registered in the event detection unit 410 exists. Further, the gating controller 400 can measure and store the time spent in applying the clock and the power. Then, according to the supply of the clock and the power, the display controller 450 can generate display data corresponding to the detected event and output the display data to the display unit 320.

The screen change can have different frame rates according to processed events. For example, the change rate of a UI screen can have 60 frames per sec (fps) and a video can have 30 fps. Further, a screen displaying time can have a screen change cycle of 100 ms or 10 ms according to the screen displaying change of seconds or minutes. The gating controller 400 can predict a screen change rate of a currently executed application and then calculate times T1 and T2 to enable screen change in the next frame.

Therefore, after executing the screen change, the gating controller 400 can analyze the screen change cycles of previous frames to predict the next screen change cycle and thus calculate times T1 and T2. In calculating times T1 and T2, an average value is first obtained by giving weight values to screen change time points according to the order of screen change requests. Then, times T1 and T2 is calculated based on the obtained average value and the time measured at the time of applying the clock. Further, the gating controller 400 can set the timer to time T1. Thereafter, the gating controller 400 can control the clock management unit 420 and the power management unit 430 by using the set times T1 and T2. That is, in a state where the T1 timer operates, the gating controller 400 can control the clock management unit 420 and the power management unit 430 to supply the clock and the power to the display controller 450. Thereafter, when the T1 timer expires, the gating controller 400 controls the clock management unit 420 to block the clock supplied to the display controller 450 and operates the T2 timer. In this state, the power supply is maintained. Thereafter, when the T2 timer expires, the gating controller 400 can control the power management unit 430 to block the power supplied to the display controller 450.

Figure 5:
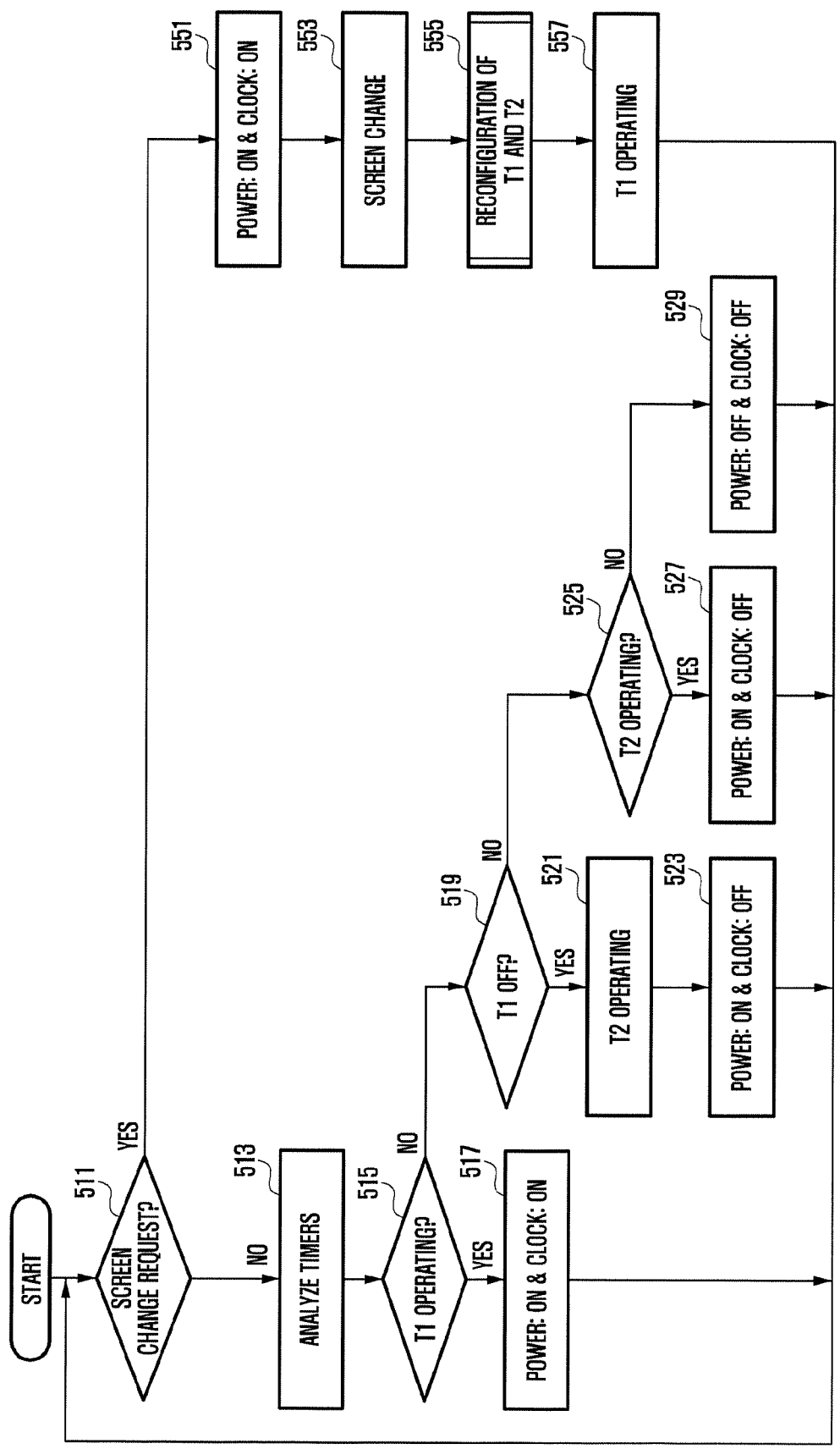
FIG. 5 is a flowchart illustrating a process for controlling screen change by an electronic device.

FIG. 5 is a flowchart illustrating a process for controlling screen change by an electronic device.

Referring to FIG. 5, when an event occurs and screen change is thus required, the controller 300 detects the request in operation 511, controls the clock management unit 420 and the power management unit 430 to supply a clock and power to the display controller 450 in operation 551, and controls the display controller 450 to transmit display data of a changed screen to the display unit 320. At this time, the controller 300 can supply the clock and/or power according to the state at the time point of the screen change request. That is, when the display block is in a clock-on-and-power-on state, display data of a changed screen is transmitted to the display unit 320. However, when the display block is in a clock-off-and-power-on state, display data of a changed screen can be transmitted to the display unit 320 after the clock is turned on, and the time spent at the time of applying the clock can be measured and stored. Further, when the display block is in a clock-off-and-power-off state, display data of a changed screen can be transmitted to the display unit 320 after both the clock and the power are turned on, and the time spent at the time of applying the clock and the power can be measured and stored. The time spent at the time of applying the clock can be shorter than the time spent at the time of applying the clock and the power, and the reason why the time spent at the time of applying the clock and/or the power is to take the time into consideration when the T1 timer and the T2 timer are operated later.

Thereafter, the controller 300 can reconfigure times T1 and time T2 in operation 555. That is, in calculating times T1 and T2 in operation 555, the controller 300 first obtains an average value by giving weight values to screen change time points according to the order of screen change requests, and then calculates times T1 and T2 based on the obtained average value and the time measured at the time of applying the clock/power.

Figure 6:
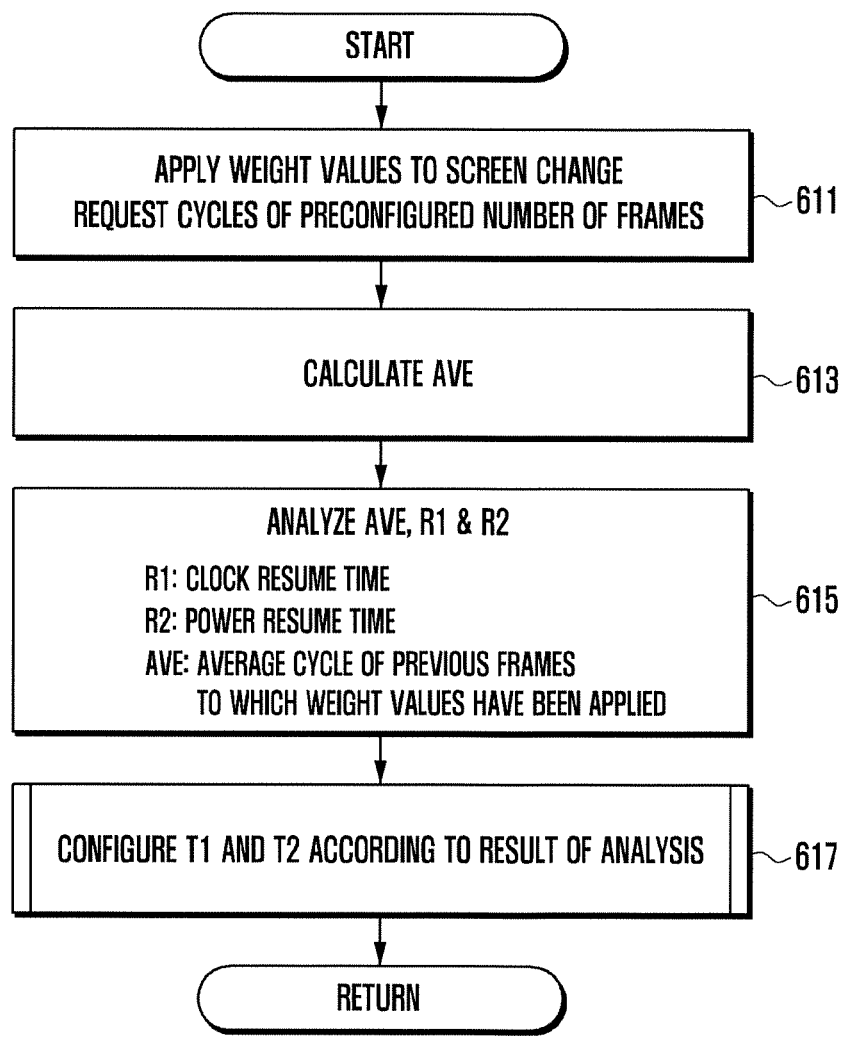
FIG. 6 is a flowchart illustrating a method for configuring time for controlling clock and power supply in an electronic device.

FIG. 6 is a flowchart illustrating a method for configuring time for controlling clock and power supply in an electronic device. Referring to FIG. 6, in operation 611, the controller 300 can obtain screen change request cycles of previous configured frames, apply preconfigured weight values to the obtained screen change request cycles of the frames, and then total up them. For example, let us assume that there are five configured frames and more weight values are applied to more recent frames. Then, the controller 300 can obtain screen change request cycles respectively requested in five previous frames, multiply the cycles by the weight values corresponding to them, respectively, and then total up the frame request cycles in the five frame sections having been multiplied by the weight values. Thereafter, in operation 613, the controller 300 can obtain an average screen change cycle, Ave by averaging screen change request cycles in the five previous frame sections to which the summed weight values have been applied (that is, by dividing the sum of the frame request cycles of the previous frames, to which the weight values have been applied, by a value obtained by adding the sum of all weight values and the number of frames). Thereafter, the controller 300 can analyze a configured clock resume value R1, a power resume value R2, and the averaged screen change cycle, Ave in operation 615, and then calculate T1 and T2 according to a result of the analysis in operation 617.

In this event, in operations 615 and 617, the controller 300 can determine times T1 and T2 according to whether the Ave value has been changed (increased, reduced, or unchanged), and results of comparison between the Ave value and the R1 value and comparison between the Ave value and the R2 value. In a state where the Ave value has been increased or unchanged, when the Ave value is larger than R1 or R2, the time T1 can be determined as zero (T1=0). Further, in the other states, the time T1 can be determined as one of R1 and one frame cycle. Further, the time T2 can be determined as one of R2 and the Ave value.

After times T1 and time T2 are determined while the process as shown in FIG. 6 is performed, the controller 300 operates the T1 timer in operation 557. Further, when there is no screen change request, the controller 300 can detect it and analyze the value of the timer in operation 513. In this event, in the state where the T1 timer operates, when there is screen change request, the controller 300 can detect it in operation 515 and can control the clock management unit 420 and the power management unit 430 to supply the clock and the power to the display controller 450 in operation 517. Thereafter, when the T1 timer expires, the controller 300 can detect it in operation 519 and control the clock management unit 420 to block the clock supplied to the display controller 450 and operate the T2 timer in operation 523. In this case, the display block is in a state where the supply of the clock thereto has been blocked and the power is supplied thereto. Further, in the state where the T2 timer operates, the controller 300 can detect it in operation 525, and then control the clock management unit 420 and the power management unit 430 to turn off the clock supply and maintain the power supply. When the T2 timer expires, the controller 300 can control the clock management unit 420 and the power management unit 430 to maintain the state where the supply of the clock and the power has been blocked.

Figure 7:
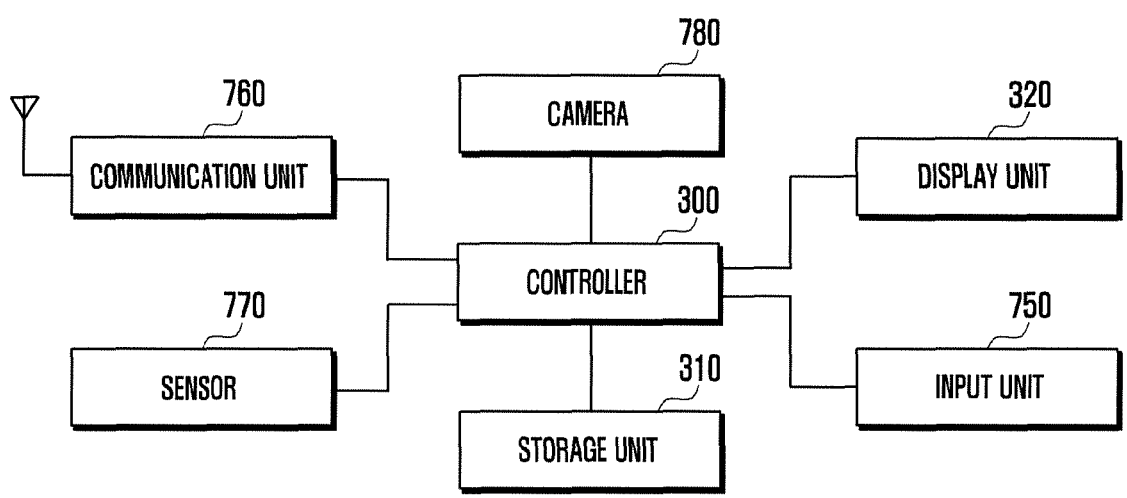
FIG. 7 is a block diagram illustrating the construction of a portable terminal performing a clock/power gating operation.
Figure 8:
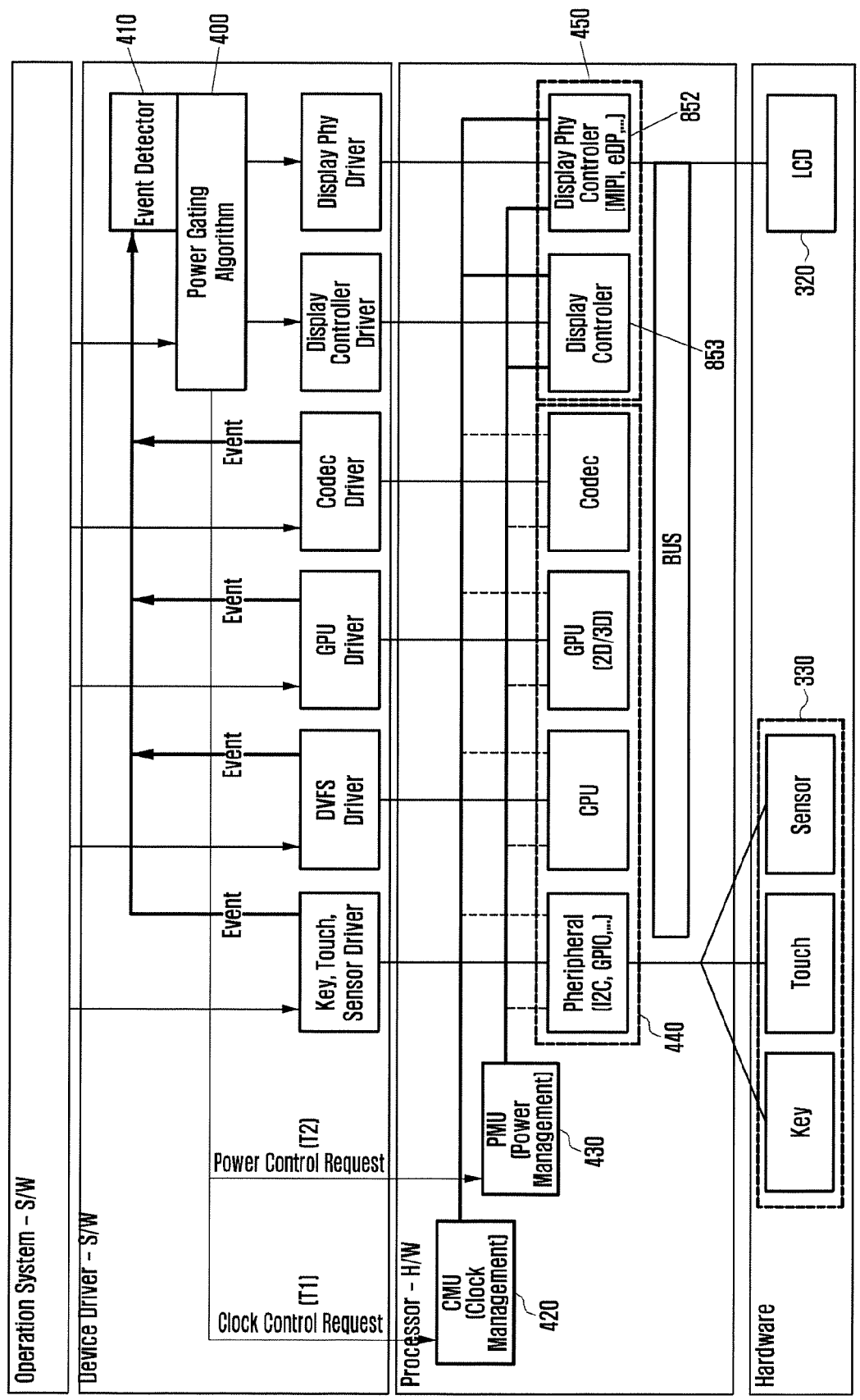
FIG. 8 illustrates the construction of a display block for performing a display clock/power gating in a portable terminal.

FIG. 7 is a block diagram illustrating the construction of a portable terminal performing a clock/power gating operation. FIG. 8 illustrates the construction of a display block for performing a display clock/power gating in a portable terminal. The portable terminal can be one of various digital devices including a mobile phone, an MP3 terminal, a tablet PC, a computer, and a camera device.

Referring to FIGS. 7 and 8, the controller 300 controls general operations of the electronic device. In response to a screen change request, the controller 300 can supply a clock and power to the display block and then transmit data of a screen to be changed to the display unit, and can predict a screen change cycle of the next frame by analyzing screen change cycles of configured frames and then configure time for gating control of the clock and the power. Thereafter, the controller 300 operates the timer in the state where there is no screen change request. Further, when the timer for controlling the clock supply expires, the controller 300 can turn off the clock supply to the display block while maintaining the power supply thereto and operate the timer for controlling the power supply. Thereafter, in the state where there is no screen change request, when the timer for controlling the power supply expires, the controller 300 turns off the clock and power supply to the display block. Further, the controller 300 can generate an on-control signal for the clock and/or the power in consideration of the clock/power reconfiguration time according to the current state (of/off state of the power and/or clock) before the time point at which a next screen change request is expected.

A storage unit 310 can include a program memory for storing an operation program of the electronic device and a program according to an embodiment of the present invention and a data memory for storing processed information.

The display unit 320 can display data received under the control of the controller 200. The display unit 320 can include a Liquid Crystal Display (LCD), a Light Emitting Diode (LED), or an Organic Light Emitting Diode (OLED) and can display the display data transmitted from the display block of the controller 300 at the screen change time point.

The input unit 750 can generate a command or data for the portable terminal. The input unit 750 can be a touch panel. The input unit 750 can detect the position (coordinate information) of an input touched on or hovering over a touch panel. The input unit 750 can further a touch panel for detecting a touch input. The display unit 320 and the input unit 750 can be configured as an integral touch screen.

The communication unit 760 can include a transmitter for up-converting the frequency of a transmitted signal and amplifying the power thereof and a receiver for low noise-amplifying a received signal and down-converting the frequency thereof. Further, the communication unit 760 can include a modulator and a demodulator. The modulator can modulate the transmitted signal and transfers the modulated signal to the transmitter and the demodulator can demodulate a signal received through the receiver. In this case, the modulator and the demodulator can use LTE, WCDMA, GSM, WIFI, WIMAX, NFC, or Bluetooth. In an embodiment of the present invention, it is assumed that the communication unit 760 includes communication units such as LTE, WIFI, Bluetooth, NFC and the like.

The sensor 770 can detect movement (action) of the portable terminal. The sensor 770 can include an acceleration sensor, a geomagnetic sensor and/or gyro sensor and can detect tilting and/or rotation state of the portable terminal. In the following description, it is assumed that the movement (action) is tilting.

The camera 780 includes an image sensor and can detect an external image, convert the image to an electric signal and digital data, and then output the converted signal and data. The camera 780 can include dual cameras. Then, a first camera can be mounted to the rear surface of the dual camera and a second camera can be mounted to a bezel area on the front surface thereof. The first camera can include a high pixel image sensor having a larger number of pixels than the second camera. The first camera and the second camera can be either independently or simultaneously operated under the control of the controller 300.

In the construction as illustrated in FIG. 1, the input unit 750, the communication unit 760, the sensor 770, and the camera 780 can be included in the event generation unit 330 shown in FIG. 3.

FIG. 8 is an internal block diagram illustrating the display block and the configuration for controlling the display block. Referring to FIG. 8, the event generation unit 330 can generate various events requiring execution of the screen change as described above. As described above, the event generation unit 330 can include the input unit 750, the communication unit 760, the sensor 770, and the camera 780 and the event can be a key input, a sensor input, a communication, or a camera operation. When an event is generated by the event generation unit 330, the event processor 440 can process the generated event and the event detection unit 410 can detect the processed event. The event processor 440 can include a peripheral device (e.g. I2C, GPIO, etc.), a Central Processing Unit (CPU), a GPU (2D/3D), and codec. Further, the event processor 440 can be processor hardware and the controller 300 can have device software corresponding to the processor hardware. Elements of the device software corresponding to the processor hardware can include a peripheral (e.g. key, touch, and sensor) driver, a Dynamic Voltage Frequency Scaling (DVFC) driver, a GPU driver, and a codec driver.

When an event occurs in one of the drivers as described above (peripheral (key, touch, or sensor) driver, DVFS driver, GPU driver, or codec driver), the event detection unit 410 can detect the event and transfer the detected event to the clock/power gating controller. Then, the gating controller 400 can determine whether an event registered in the event detection unit 410 has been generated, and can control the Clock Management Unit (CMU) 420 and a Power Management Unit (PMU) 430 to apply a clock and power to a display controller 450 when an event registered in the event detection unit 410 exists. The display controller 450 can include elements of processor hardware, a display control module 853 and a display physical control module 852, and elements of device driver software, a display control driver and display physical control driver.

The gating controller 400 can identify the current state (i.e. power-and-clock-on state, power-off-and-clock-on state, or power-and-clock-off state) of the display controller 450 before the screen change request occurs, calculate the clock/power reconfiguration time according to the identified state, and generate a gating signal based on the calculation ahead of time. Then, the clock management unit 420 and the power management unit 430 can supply the clock and the power to the display controller 420 to perform the reconfiguration operation ahead of time. Thereafter, in response to a screen change request, the display controller 450 in the state where the clock and the power have been reconfigured can transmit display data for screen change to the external display unit 320. Then, the display unit 320 can receive the display data and can display a changed screen with minimized reconfiguration time for the display block of the controller 300.

Here, the screen change can have different frame rates according to processed events. For example, the change of UI screen can have 60 frames per sec (fps) and a video can have 30 fps. Further, a screen displaying time can have a screen change cycle of 100 ms or 10 ms according to the screen displaying change of seconds or minutes. The gating controller 400 can predict a screen change rate of a currently executed application and then calculate times T1 and T2 to enable screen change in the next frame.

Therefore, after executing the screen change, the gating controller 400 can analyze the screen change cycles of previous frames to predict the next screen change cycle and thus calculate times T1 and T2. In calculating times T1 and T2, an average value is first obtained by giving more weight values to screen change cycles of more recent frames among the screen change cycles of previous frames. Then, times T1 and T2 can be calculated based on the obtained average value and the time measured at the time of applying the clock. Further, the gating controller 400 can set the timer to time T1. Thereafter, the gating controller 400 can control the clock management unit 420 and the power management unit 430 by using the set times T1 and T2. That is, in a state where the T1 timer operates, the gating controller 400 can control the clock management unit 420 and the power management unit 430 to supply the clock and the power to the display controller 450. Thereafter, when the T1 timer expires, the gating controller 400 can control the clock management unit 420 to block the clock supplied to the display controller 450 and operates the T2 timer. In this state, the power supply is maintained. Thereafter, when the T2 timer expires, the gating controller 400 can control the power management unit 430 to block the power supplied to the display controller 450.

Figure 9:
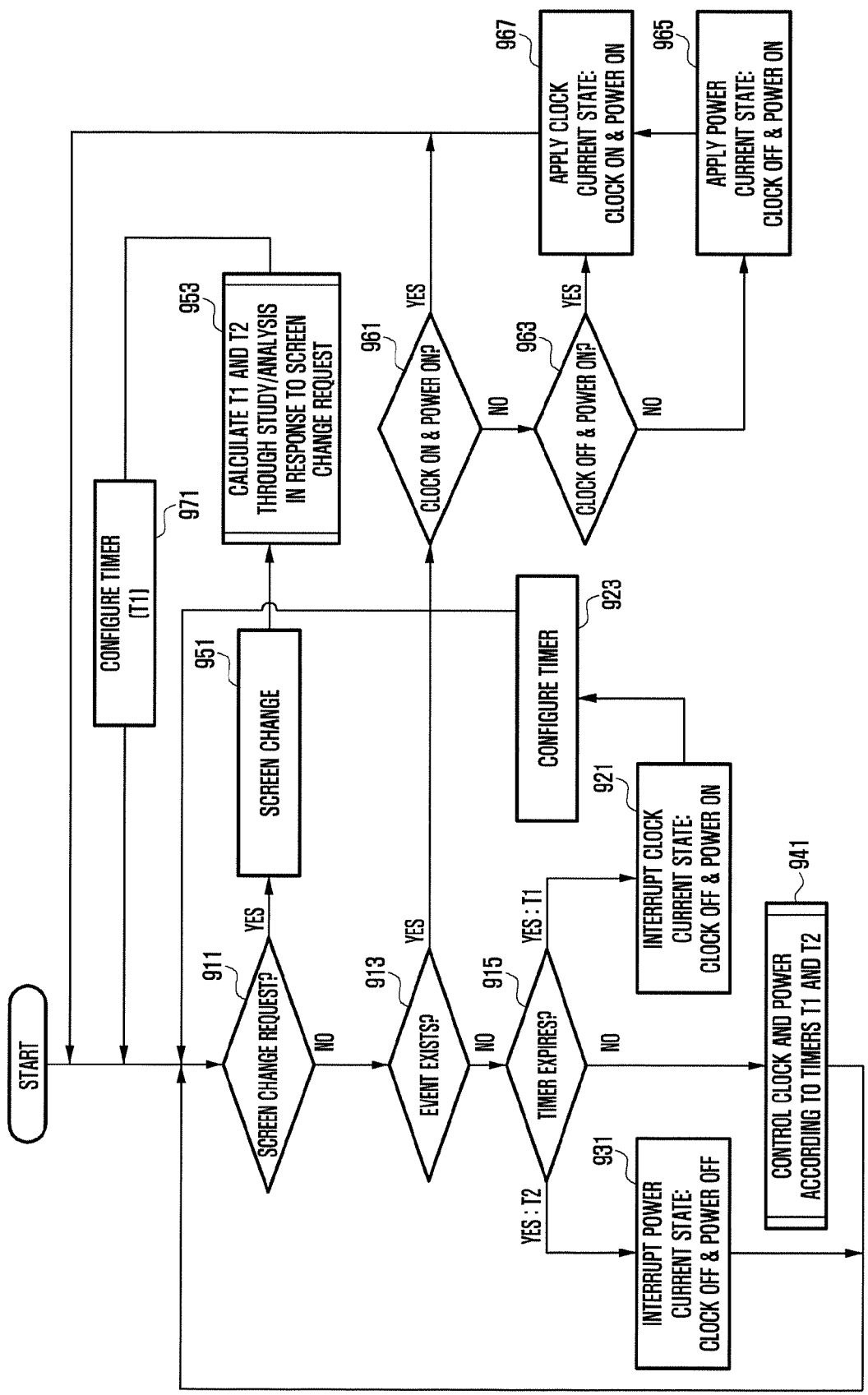
FIG. 9 is a flowchart illustrating another method for controlling screen change in a display unit by an electronic device.

FIG. 9 is a flowchart illustrating another method for controlling screen change in a display unit by an electronic device. The method shown in FIG. 9 allows a control to apply power and clock to a display block of the controller 300 at a time point at which screen change is predicted ahead of time. The electronic device can have the constructions as shown in FIGS. 7 and 8. Further, FIG. 10 illustrates an example of a method for controlling gating of power and clock while performing the process as shown in FIG. 9, and FIG. 11 illustrates another example of the method for controlling gating of power and clock while performing the process as shown in FIG. 9.

Figure 10:
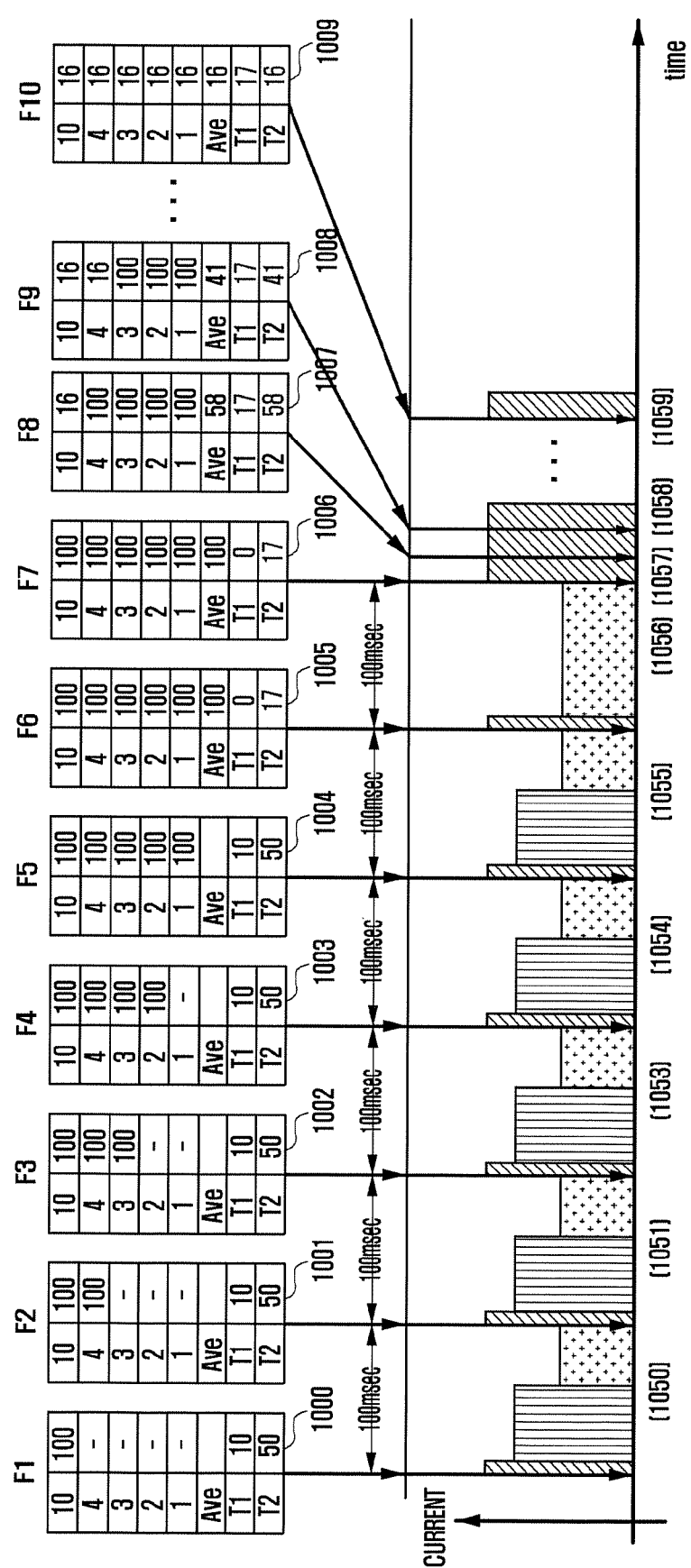
FIG. 10 illustrates an example of a method for controlling gating of the power and the clock while performing the process shown in FIG. 9.
Figure 11:
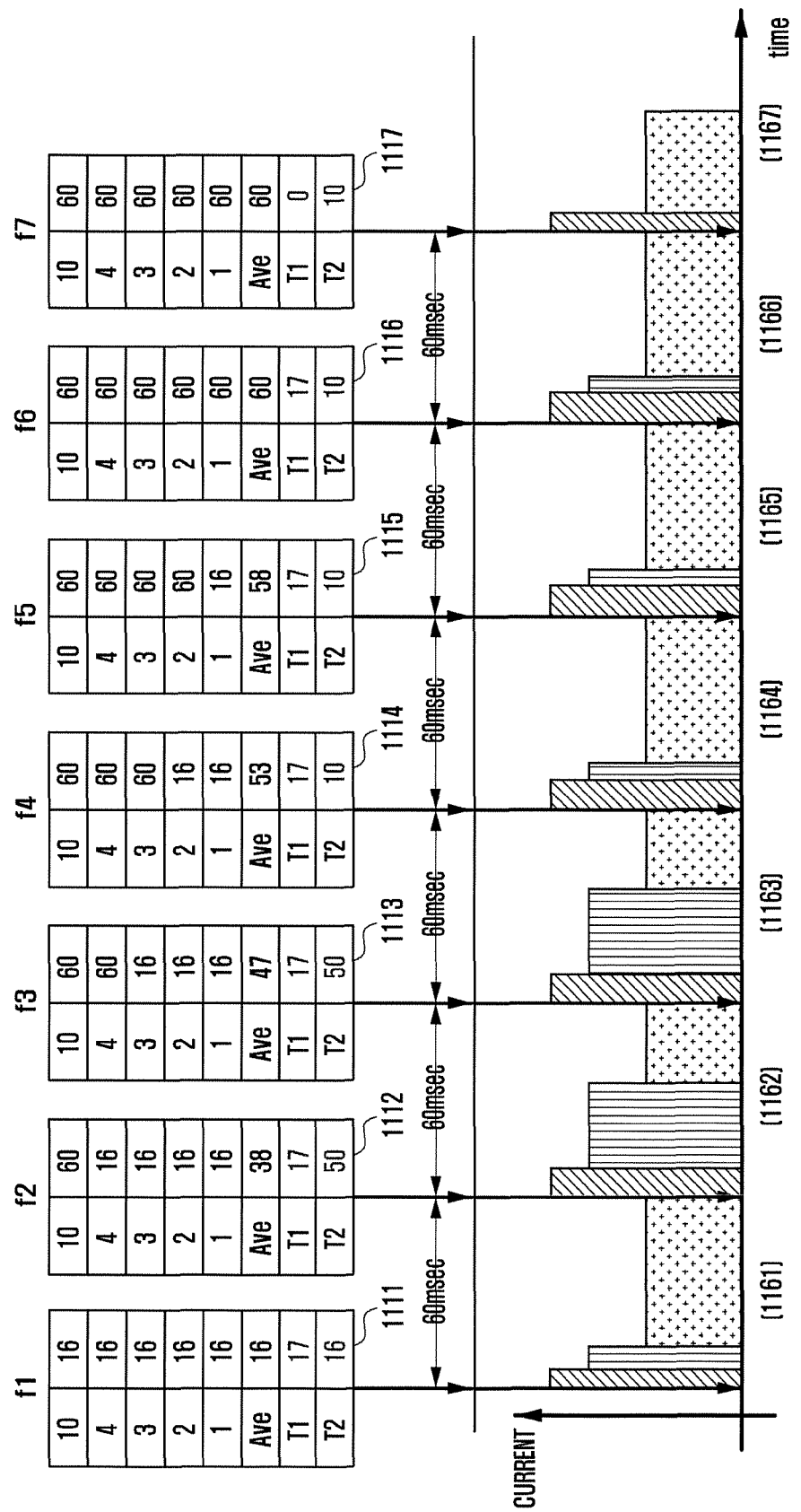
FIG. 11 illustrates another example of a method for controlling gating of the power and the clock while performing the process shown in FIG. 9.

Referring to FIG. 9 to FIG. 11, when there is an event and screen change is thus necessary, the controller 300 can detect it in operation 913, can analyze the current state of the display block in operation 961, and then generate a gating control signal for supplying a clock and power. In this event, the controller 300 can know time required for reconfiguration of the power and the clock in a state where the power ahead of time and the clock of the display block have been turned off, and time required for reconfiguration of the clock in a state where the power is supplied to of the display block and the clock thereof has been turned off. That is, the controller 300 can measure, through experiments, time required for reconfiguration of the clock and/or the power in each state of the display block, so as to pre-store the time for the gating control. In this event, if the clock and the power of the display block have been turned off, the controller 300 can detect it while performing operation 961 and operation 963, control the power management unit 430 to supply the power to the display block in operation 965, and control the clock management unit 420 to supply the clock to the display block in operation 967. Further, if the display block is in a state where the clock thereof is off and the power thereof is on, the controller 300 can detect it while performing operation 961 and operation 963, and control the clock management unit 420 to supply the clock to the display block in operation 967. Further, if the display block is in a state where the clock and the power thereof are on, the controller 300 can detect it in operation 961 and maintain the state where the clock and the power are supplied to the display block. In this event, the reconfiguration time in the state where the clock and the power of the display block are off need to be longer than the reconfiguration time in the state where only the clock of the display block is off, and such configuration time should be taken into consideration in controlling the clock and the power of the display block. In this event, the time spent at the time of applying the clock and/or the power can be stored. The stored time can be taken into consideration in operating the T1 and T2 timers.

Thereafter, if screen change is requested, the controller 300 can detect it in operation 911, control the display block to transmit display data for changing the screen to the display unit 320 in operation 951, and calculate times T1 and T2 for determining the screen change time point for the next frame by analyzing the previous screen change cycles in operation 953. In this event, the calculation of times T1 and T2 can be performed through the process shown in FIG. 6. Here, based on an assumption that there are five configured frames, parameters are defined as shown in Table 2 below.

TABLE 2

R1: clock resume time (ex = 10 ms)
R2: power resume time (ex = 50 ms)
T1: Time for entering the clock gating when there is no screen change request for time T1 in the normal state
T2: Time for entering the clock gating when there is no screen change request for time T2 in the normal/clock-off state
Ave: average frema cycle of previous five frames to which weight values (for example, n frame = 10, (n − 1) frame = 4, (n − 2) frame = 3, (n − 3) frame = 2, and (n − 4) frame = 1) have been applied
1 frame time: time corresponding to one frame in fps (frame per second) configured in the system (e.g. 60 fps = $\frac{1}{60}$ s = 16.6 (hereinafter, refered to as 17) msec
When information for calculation of Ave considering the weight values is not sufficient:
T1 = R1, T2 = R2

In operation 611, the controller 300 can obtain screen change request cycles of five previous frames, apply pre-configured weight values to the obtained screen change request cycles of the frames, and then total up them. Then, the controller 300 can obtain screen change request cycles respectively requested in five previous frames, multiply the cycles by the weight values corresponding to them, respectively, and then total up the frame request cycles in the five frame sections having been multiplied by the weight values. Thereafter, in operation 613, the controller 300 can obtain an average screen change cycle, Ave by averaging screen change request cycles in the five previous frame sections to which the summed weight values have been applied (that is, by dividing the sum of the frame request cycles of the previous frames, to which the weight values have been applied, by a value obtained by adding the sum of all weight values and the number of frames). Thereafter, the controller 300 can analyze a configured clock resume value R1, a power resume value R2, and the averaged screen change cycle Ave in operation 615, and then calculate T1 and T2 according to a result of the analysis in operation 617. In the calculation, the times T1 and T2 can be obtained by analyzing whether there is change in the Ave value (condition 1), the relation between the Ave value and the R1 value (condition 2) and the relation between the Ave value and the R2 value (condition 3).

Referring to FIG. 10, the information for calculation of Ave in consideration of the weight values is not sufficient in frame sections F1 to F5, in which times T1 and T2 are determined as 10 ms and 50 ms, respectively, as indicated by reference numerals 1000 to 1004. Thereafter, if the screen change cycle of fame F6 is 100 ms, the controller 300 obtains 100 msec as the Ave value by multiplying corresponding weight values to the screen change cycles of frames F2 to F6 and then obtaining their average value. Thereafter, the controller 300 determines times T1 and T2 by analyzing Ave, R1, and R2. Times T1 and T2 in frames F1 to F10 can be determined through the analysis as shown in Table 3 below.

TABLE 3

| Frame | R1 | R2 | Ave | Condition analysis | T1 | T2 |
| --- | --- | --- | --- | --- | --- | --- |
| F1 | 10 ms | 50 ms | 100 | weight calculation is unnecessary | R1 | R2 |
| F2 | 10 ms | 50 ms | 100 | weight calculation is unnecessary | R1 | R2 |
| F3 | 10 ms | 50 ms | 100 | weight calculation is unnecessary | R1 | R2 |
| F4 | 10 ms | 50 ms | 100 | weight calculation is unnecessary | R1 | R2 |
| F5 | 10 ms | 50 ms | 100 | weight calculation is unnecessary | R1 | R2 |
| F6 | 10 ms | 50 ms | 100 | Ave increase, Ave ≥ R1, Ave ≥ R2 | 0 | 1F time |
| F7 | 10 ms | 50 ms | 100 | Ave unchanged, Ave ≥ R1, Ave ≥ R2 | 0 | 1F time |
| F8 | 10 ms | 50 ms | 58 | Ave decrease, Ave ≥ R1, Ave ≥ R2 | larger value between R1 and 1F time | Larger value between R2 and Ave |
| F9 | 10 ms | 50 ms | 41 | Ave decrease Ave ≥ R1, Ave < R2 | larger value between R1 and 1F time | smaller value between R2 and Ave |
| F10 | 10 ms | 50 ms | 16 | Ave unchanged Ave ≥ R1, Ave < R2 | larger value between R1 and 1F time | smaller value between R2 and Ave |

Therefore, in the case of the screen change cycles of frames F1 to F10 as shown in FIG. 10, the controller 300 can configure times T1 and T2 as indicated by reference numerals 1000 to 1009 according to the analysis of Ave, R1, and R2 as shown in Table 3, and the supply of the clock and the power of the display block are controlled according to times T1 and T2 as indicated by reference numerals 1000 to 1009 to save the current consumption as indicated by reference numerals 1050 to 1059.

Further, referring to FIG. 11, Times T1 and T2 in frames f1 to f7 can be determined through the analysis as shown in Table 4 below.

TABLE 4

| Frame | R1 | R2 | aAve | Condition analysis | T1 | T2 |
|---|---|---|---|---|---|---|
| f1 | 10 ms | 50 ms | 16 | aAve increase, aAve ≥ R1, Ave < R2 | larger value between R1 and 1F time | smaller value between R2 and Ave |
| f2 | 10 ms | 50 ms | 38 | aAve increase, aAve ≥ R1, Ave < R2 | larger value between R1 and 1F time | R2 |
| f3 | 10 ms | 50 ms | 47 | aAve increase, aAve ≥ R1, Ave ≥ R2 | larger value between R1 and 1F time | R2 |
| f4 | 10 ms | 50 ms | 53 | aAve increase, ave ≥ R1, ave ≥ R2 | larger value between R1 and 1F time | R1 |
| f5 | 10 ms | 50 ms | 58 | aAve increase, aAve ≥ R1, Ave ≥ R2 | larger value between R1 and 1F time | R1 |
| f6 | 10 ms | 50 ms | 60 | aAve increase, aAve ≥ R1, Ave ≥ R2 | larger value between R1 and 1F time | R1 |
| f7 | 10 ms | 50 ms | 60 | aAve unchanged, aAve ≥ R1, Ave ≥ R2 | 0 | R1 |

Therefore, in the case of the screen change cycles of frames f1 to f7 as shown in FIG. 11, the controller 300 can configure times T1 and T2 as indicated by reference numerals 1111 to 1117 according to the analysis of Ave, R1, and R2 as shown in Table 4, and the supply of the clock and the power of the display block are controlled according to times T1 and T2 as indicated by reference numerals 1111 to 1117 to save the current consumption as indicated by reference numerals 1161 to 1067.

The controller 300 can determine times T1 and T2 while performing the process as shown in FIG. 6 in operation 953, and operate the T1 timer in operation 971. Thereafter, when there is no screen change request in the state where the T1 timer operates, the controller can analyze the value of the operated timer. In this event, in the state where the T1 timer operates, when there is screen change request, the controller 300 can detect it in operation 915 and can control the clock management unit 420 and the power management unit 430 to supply the clock and the power to the display controller 450 in operation 941. Thereafter, when the T1 timer expires, the controller 300 can detect it in operation 915, control the clock management unit 420 to block the clock supplied to the display controller 450 in operation 921, and operate the T2 timer in operation 923. In this case, the display block is in a state where the supply of the clock thereto has been blocked and the power is supplied thereto. Further, in the state where the T2 timer expires, the controller 300 can detect it in operation 941, and control the clock management unit 420 and the power management unit 430 to block the clock supply and allow the power supply. Thereafter, when the T2 timer expires, the controller 300 may detect it in operation 915 and control the clock management unit 420 and the power management unit 430 to maintain the interruption of the supply of the clock and the power.

As described above, a controller in an electronic device can dynamically calculate parameters required for display clock/power gating when transmitting data for screen change to a display unit. According to the clock/power gating method, it is possible to predict a next screen change request cycle by analyzing previous screen change request cycles and predict the next state to which the current state is to be changed, by measuring the time consumed when applying the actual clock and/or power. Since times T1 and T2 are dynamically calculated based on learned/analyzed screen change cycles as described above, the present invention can reduce the current consumption in the entire scenario of the electronic device. Further, it is possible to perform the operations necessary for screen change ahead of time (i.e. supply of power and/or clock ahead of time) before the time point of screen change, so as to achieve rapid restarting at the time of display clock/power gating. In the case where screen change occurs, the restarting of the display block is performed ahead of time using an event recognizable ahead of time as described above. Therefore, it is possible to minimize the restarting time and thus reduce the user reaction time.

The embodiments disclosed in the present specifications and drawings were provided merely to readily describe and to help a thorough understanding of the present invention but not intended to limit the scope of the present invention. Therefore, it should be construed that all modifications or modified forms drawn by the technical idea of the present invention in addition to the embodiments disclosed herein are included in the scope of the present invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a screen display of an electronic device, the method comprising:
   a screen change operation including, in response to a screen change request, outputting data of a screen to be changed, to a display unit, and predicting a next screen change cycle; and
   an operation of switching into a power saving mode when no screen change request is received, wherein the screen changing operation includes adjusting a clock timer for converting the display unit into the power saving mode as a function of a plurality of previous screen change cycles of the display unit.

2. The method of claim 1, wherein the screen change operation comprises, in response to a screen change request, supplying a clock and power to a display block and configuring the clock timer and a power timer of a predicted next screen change cycle; and the operation of switching into the power saving mode comprises analyzing the timer, interrupting supply of the clock to the display block and operating the power timer when the clock timer expires, and interrupting supply of the clock and the power to the display block when the power timer expires.

3. The method of claim 1, wherein the screen change operation comprises:

an operation of supplying a clock and power to the display block in response to a screen change request;

an operation of outputting data for screen change to the display unit through the display block; and an operation of obtaining an average value by applying weight values to screen change cycles generated in a preconfigured number of previous frame sections at the time of configuring the clock timer and a power timer and analyzing the average value to determine values of the clock timer and the power timer corresponding to a screen change cycle of a next frame.

4. The method of claim 3, wherein the operation of determining values of the clock timer and the power timer comprises:

analyzing an increase or decrease of the average value, comparing the average value and a clock resume time, and determining the values of the clock timer and the power timer based on a result of the comparison between the average value and the clock resume time.

5. The method of claim 3, wherein the operation of supplying the clock or the clock and the power to the display block comprises:

analyzing a gating state of the display block;

when the analysis shows a result that the power is being supplied in a state where the supply of the clock has been interrupted, supplying a clock while maintaining the power supply; and when the analysis shows a result that the supply of the power and the clock has been interrupted, supplying power and then supplying a clock.

6. The method of claim 3, wherein the switching operation comprises:

supplying a clock and power to the display block when the clock timer operates without the screen change request;

turning off the supply of the clock to the display block, maintaining the supply of the power thereto, and operating the power timer when the clock timer operates without the screen change request;

turning off the supply of the clock to the display block and maintaining the supply of the power thereto when the power timer operates without the screen change request; and turning off the supply of the clock and the power to the display block when the power timer operates without the screen change request.

7. A method for controlling a screen display of an electronic device, the method comprising:

an operation of supplying a clock and power to a display block at a preconfigured time point before screen change;

an operation of, in response to a screen change request, outputting data of a screen to be changed, to a display unit and predicting a next screen change cycle; and an operation of switching into a power saving mode when there is no screen change request, wherein the operation of supplying the clock and power comprises adjusting a clock timer for converting the display unit into the power saving mode as a function of a plurality of previous screen change cycles of the display unit.

8. The method of claim 7, wherein the operation of predicting the next screen change cycle comprises configuring the clock timer and a power timer of the predicted screen change cycle, operating the clock timer, and changing the screen;

the operation of switching into the power saving mode comprises analyzing the timer, interrupting supply of the clock to the display block and operating the power timer when the clock timer expires, and interrupting supply of the clock and the power to the display block when the power timer expires.

9. The method of claim 8, wherein the screen change operation comprises:

obtaining an average value by applying weight values to screen change cycles generated in a preconfigured number of previous frame sections at the time of configuring the clock timer and the power timer; and analyzing the average value to determine values of the clock timer and the power timer corresponding to a screen change cycle of a next frame.

10. The method of claim 9, wherein the operation of determining values of the clock timer and the power timer comprises:

analyzing an increase or decrease of the average value, comparing the average value and a clock resume time, and determining the values of the clock timer and the power timer based on a result of the comparison between the average value and the clock resume time.

11. The method of claim 9, wherein the operation of supplying the clock or the clock and the power to the display block comprises:

analyzing a gating state of the display block;

when the analysis shows a result that the power is being supplied in a state where the supply of the clock has been interrupted, supplying a clock while maintaining the power supply; and when the analysis shows a result that the supply of the power and the clock has been interrupted, supplying power and then supplying a clock.

12. The method of claim 9, wherein the switching operation comprises:

supplying a clock and power to the display block when the clock timer operates without the screen change request;

turning off the supply of the clock to the display block, maintaining the supply of the power thereto, and operating the power timer when the clock timer operates without the screen change request;

turning off the supply of the clock to the display block and maintaining the supply of the power thereto when the power timer operates without the screen change request; and turning off the supply of the clock and the power to the display block when the power timer operates without the screen change request.

13. An electronic device comprising:

an event generation unit configured to generate a screen change event;

a display unit configured to receive screen change data and change a displayed screen; and a controller configured to:
> in response to a detected screen change event, output data of a screen to be changed, to the display unit, predict a next screen change cycle, and
> switch into a power saving mode when there is no screen change request,
> wherein the controller is further configured to adjust a clock timer for converting the display unit into the power saving mode as a function of a plurality of previous screen change cycles of the display unit.

14. The electronic device of claim 13, wherein, in response to a screen change request, the controller configured to supply a clock and power to a display block, and configure the clock timer and a power timer of a predicted next screen change cycle, analyze the timer when there is no screen change request and interrupts supply of the clock to the display block, operate the power timer when the clock timer expires, and interrupt the supply of the clock and the power to the display block when the power timer expires.

15. The electronic device of claim 14, wherein the controller comprises:
> an event detection unit configured to detect an event generated in the event generation unit;
> a clock management unit configured to supply the clock;
> a power management unit configured to supply power;
> a display controller configured to transmit display data for screen change to the display unit; and
> a gating controller configured to:
>> control the clock management unit and the power management unit to supply a clock and power to the display controller in response to a screen change request when an event is detected,
>> predict a screen change cycle of a next frame and configures the clock timer and the power timer,
>> analyze the timers when there is no screen change request,
>> control the clock management unit to interrupt supply of the clock to the display controller when the clock timer expires, and
>> control the power management unit to interrupt supply of the power to the display controller when the power timer expires.

16. The electronic device of claim 15, wherein the gating controller is configured to control the clock management unit and the power management unit at a preconfigured time point before screen change, supply a clock and power to the display controller to output screen change output data without delay at a screen change request time point, configure the clock timer and the power timer by predicting a screen change cycle of a next frame, and operate the clock timer.

17. The electronic device of claim 15, wherein the event generation unit comprises at least one of:
> an input unit configured to detect a touch input and a key input;
> at least one sensor configured to detect the state of the electronic device;
> a communication unit configured to communicate with external devices and/or systems; and
> a camera configured to acquire an external image.

18. The electronic device of claim 15, wherein the gating controller is configured to obtain an average value by applying weight values to screen change cycles generated in a preconfigured number of previous frame sections at the time of configuring the clock timer and the power timer, and analyze the average value to determine values of the clock timer and the power timer corresponding to a screen change cycle of a next frame.

19. The electronic device of claim 18, wherein the gating controller is configured to analyze an increase or decrease in the average value, compare the average value and a clock resume time, and determine the values of the clock timer and the power timer based on a result of the comparison between the average value and the clock resume time.

20. The electronic device of claim 18, wherein the gating controller is configured to inspect a state of the display controller when supplying the clock and the power to the display controller before the screen change, supply a clock while maintaining the power supply when the power is being supplied in a state where the supply of the clock has been interrupted, and supply power and then supply a clock when the supply of the power and the clock has been interrupted.

21. The electronic device of claim 18, wherein the gating controller is configured to:
> supply a clock and power to the display block when the clock timer operates without the screen change request;
> turns off the supply of the clock to the display block, maintain the supply of the power thereto, and operate the power timer when the clock timer operates without the screen change request;
> turn off the supply of the clock to the display block and maintain the supply of the power thereto when the power timer operates without the screen change request; and
> turn off the supply of the clock and the power to the display block when the power timer operates without the screen change request.

* * * * *